United States Patent
Jou et al.

(10) Patent No.: US 6,564,042 B1
(45) Date of Patent: May 13, 2003

(54) VELOCITY-ESTIMATION-BASED GAIN TABLES

(75) Inventors: Yu-Cheun Jou, San Diego, CA (US); Sandip Sarkar, San Diego, CA (US); Jack M. Holtzman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/519,004

(22) Filed: Mar. 3, 2000

(51) Int. Cl.[7] .............................. H04B 1/06; H04B 7/00
(52) U.S. Cl. ..................... 455/238.1; 455/522; 455/441
(58) Field of Search ........................ 455/522, 24, 67.1, 455/69, 67.6, 238.1, 245.1, 423, 440, 441

(56) References Cited

U.S. PATENT DOCUMENTS

| | | | |
|---|---|---|---|
| 4,901,307 A | | 2/1990 | Gilhousen et al. |
| 5,056,109 A | | 10/1991 | Gilhousen et al. |
| 5,103,459 A | | 4/1992 | Gilhousen et al. |
| 5,140,695 A | * | 8/1992 | Yasuda et al. ............... 455/450 |
| 5,239,667 A | * | 8/1993 | Kanai ........................... 455/10 |
| 5,267,261 A | | 11/1993 | Blakeney, II et al. |
| 5,450,473 A | * | 9/1995 | Shiotsuki et al. ............ 455/441 |
| 5,574,984 A | | 11/1996 | Reed et al. |
| 5,778,030 A | | 7/1998 | Bruckert et al. |
| 5,884,178 A | * | 3/1999 | Ericsson et al. ............ 455/441 |
| 6,035,209 A | * | 3/2000 | Tiedemann, Jr. et al. ... 455/522 |
| 6,154,659 A | * | 11/2000 | Jalali et al. .................. 455/522 |
| 6,249,682 B1 | * | 6/2001 | Kubo et al. .................. 455/522 |
| 6,377,813 B1 | * | 4/2002 | Kansakoski et al. ........ 455/522 |

FOREIGN PATENT DOCUMENTS

| | | |
|---|---|---|
| EP | 0507480 A2 | 10/1992 |
| EP | 0869626 A1 | 10/1998 |
| WO | 96/31014 | 10/1996 |

OTHER PUBLICATIONS

Austin M.D. et al., "Velocity Adaptive Handoff Algorithms for Microcellular Systems," International Conference on Universal Personal Communications, IEEE, New York, NY, US, vol. 2, Oct. 12, 1993 (pp. 793–797).

* cited by examiner

*Primary Examiner*—Edward F. Urban
*Assistant Examiner*—Charles Craver
(74) *Attorney, Agent, or Firm*—Philip R. Wadsworth; Charles D. Brown; Kyong H. Macek

(57) ABSTRACT

A method of modifying gain tables for the reverse-link communications in a cdma2000 wireless communication network includes the steps of estimating the velocity of a mobile station for a given frame error rate (FER) and data rate, and providing three gains to choose between based on the estimated velocity in order to specify a reverse-link transmit power level. The velocity estimation may be performed using a level crossing technique, a covariance approximation technique, or a Doppler spectrum estimation technique.

10 Claims, 3 Drawing Sheets

VELOCITY-ESTIMATION-BASED GAIN TABLES

BACKGROUND OF THE INVENTION

I. Field of the Invention

The present invention pertains generally to the field of communications, and more specifically to constructing gain tables for mobile stations in a wireless communication network.

II. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. (As used herein, the term "cellular" systems encompasses both cellular and personal communications services (PCS) frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008, proposed high-data-rate systems for data, etc. (often referred to collectively herein as IS-95), are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and fully incorporated herein by reference. In CDMA systems, over-the-air power control is a vital issue. An exemplary method of power control in a CDMA system is described in U.S. Pat. No. 5,056,109, which is assigned to the assignee of the present invention and fully incorporated herein by reference.

A primary benefit of using a CDMA over-the-air interface is that communications are conducted over the same radio frequency (RF) band. For example, each mobile subscriber unit (e.g., a cellular telephone, personal digital assistant (PDA), laptop connected to a cellular telephone, hands-free car kit, etc.) in a given cellular telephone system can communicate with the same base station by transmitting a reverse-link signal over the same 1.25 MHz of RF spectrum. Similarly, each base station in such a system can communicate with mobile units by transmitting a forward-link signal over another 1.25 MHz of RF spectrum. Transmitting signals over the same RF spectrum provides various benefits including, e.g., an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a mobile unit from the coverage area of two or more base stations that involves simultaneously interfacing with two base stations. In contrast, hard handoff involves terminating the interface with a first base station before establishing the interface with a second base station. An exemplary method of performing soft handoff is described in U.S. Pat. No. 5,267,261, which is assigned to the assignee of the present invention and fully incorporated herein by reference.

In conventional cellular telephone systems, a public switched telephone network (PSTN) (typically a telephone company) and a mobile switching center (MSC) communicate with one or more base station controllers (BSCs) over standardized E1 and/or T1 telephone lines (hereinafter referred to as E1/T1 lines). The BSCs communicate with base station transceiver subsystems (BTSs) (also referred to as either base stations or cell sites), and with each other, over a backhaul comprising E1/T1 lines. The BTSs communicate with mobile units via RF signals sent over the air.

To provide increased capacity, the International Telecommunications Union recently requested the submission of proposed methods for providing high-rate data and high-quality speech services over wireless communication channels. The submissions describe so-called "third generation," or "3G," systems. An exemplary proposal, the cdma2000 ITU-R Radio Transmission Technology (RTT) Candidate Submission (referred to herein as cdma2000), was issued by the TIA. The standard for cdma2000 is given in draft versions of IS-2000 and has been approved by the TIA. The cdma2000 proposal is compatible with IS-95 systems in many ways.

One significant way in which the proposed cdma2000 system differs from an IS-95 system is that reverse-link traffic channels (i.e., the voice- or data-carrying signal from the mobile station to the base station) are demodulated coherently according to the cdma2000 proposal. Hence, a table of gains and pilot channel power levels for mobile stations is stored in each base station to enable the base station to specify traffic channel power levels for mobile stations with which the base station is communicating. The table contains different gains and pilot levels for each combination of data rate in bits per second (bps), target frame error rate (FER) (typically either one or five percent), type of forward error correction coding used by the mobile station (either convolutional coding or turbo coding), and frame length (twenty milliseconds (ms) for fundamental traffic channels and five, twenty, forty, or eighty ms for supplemental channels). The gains are expressed in decibels as ratios of the traffic channel level to the pilot channel level, multiplied by eight. An exemplary gain table is illustrated in $3^{rd}$ Generation Partnership Project 2 "3GPP2", "Physical Layer Standard for cdma2000 Spread Spectrum Systems," 3GPP2 Document No. C.P0002-A, TIA PN4694, to be published as TIA/EIA/IS-2000-2-A, (Draft, edit version 30), Table 2.1.2.3.3.2-1 (Nov. 19, 1999).

For a given target FER, the traffic to pilot ratio (gain) varies with the velocity of the mobile station. In the proposed cdma2000 submission, the traffic to pilot ratio for a pilot power level required for a given FER is calculated for three different possible mobile station velocities (high (e.g., 120 km/hr.), low (e.g., thirty km/hr.), and static (e.g., additive white Gaussian noise (AWGN))) and averaged. The resultant average value is stored in the gain table. The cdma2000 reverse link (mobile-station-to-base-station communication) thus uses predefined traffic to pilot ratios. In many cases, the optimal value for the best case may be two to three decibels (dB) lower than the value chosen, and if transmission were performed at the optimal level, it would substantially alter the power requirements for the mobile station and provide capacity gains. However, to transmit at that level, it would be necessary to estimate the velocity of the mobile station. It would be advantageous, therefore, to provide more accurate gains based on estimated velocities of the mobile station. Thus, there is a need for a method of modifying the gain tables for a mobile station in a velocity-dependent manner.

SUMMARY OF THE INVENTION

The present invention is directed to a method of modifying the gain tables for a mobile station in a velocity-dependent manner. Accordingly, in one aspect of the invention, a method of modifying a transmit power level of a mobile station in a wireless communication network is provided. The method advantageously includes the steps of estimating a velocity of the mobile station; and modifying a transmit power level of the mobile station based on the estimated velocity.

In another aspect of the invention, an infrastructure element in a wireless communication network is provided. The infrastructure element advantageously includes means for estimating a velocity of a mobile station in the wireless communication network; and means for modifying a transmit power level of the mobile station based on the estimated velocity.

In another aspect of the invention, an infrastructure element in a wireless communication network is provided. The infrastructure element advantageously includes a processor; and a processor-readable storage medium coupled to the processor and containing an instruction set executable by the processor to estimate a velocity of a mobile station in the wireless communication network and modify a transmit power level of the mobile station based on the estimated velocity.

In another aspect of the invention, an infrastructure element in a wireless communication network is provided. The infrastructure element advantageously includes a velocity estimation module configured to estimate a velocity of a mobile station in the wireless communication network; and a gain table modification module coupled to the velocity estimation module and configured to modify a gain table in the infrastructure element based on the estimated velocity, the gain table containing gains for use in modifying a transmit power level of the mobile station.

DETAILED DESCRIPTION OF THE PREFERRED EMBODIMENTS

Figure 1:
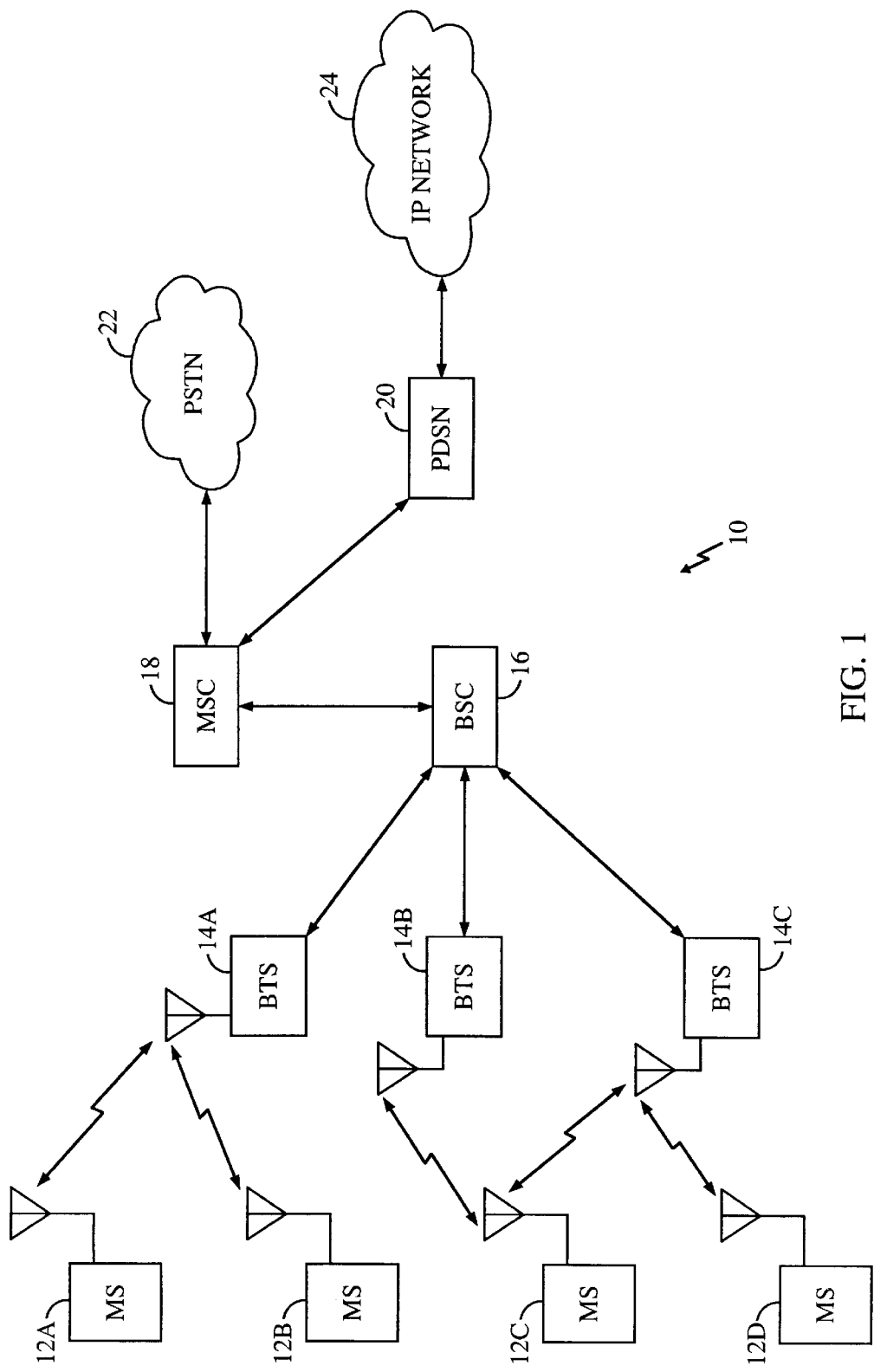
FIG. 1 is a block diagram of a wireless communication network.

As illustrated in FIG. 1, a wireless communication network 10 generally includes a plurality of mobile stations or mobile subscriber units 12a–12d, a plurality of base stations 14a–14c, a base station controller (BSC) or packet control function 16, a mobile station controller (MSC) or switch 18, a packet data serving node (PDSN) or internetworking function (IWF) 20, a public switched telephone network (PSTN) 22 (typically a telephone company), and an Internet Protocol (IP) network 18 (typically the Internet). For purposes of simplicity, four mobile stations 12a–12d, three base stations 14a–14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a–12d may be cellular telephones, cellular telephones connected to laptop computers running IP-based, Web-browser applications, cellular telephones with associated hands-free car kits, or PDAs running IP-based, Web-browser applications. The mobile stations 12a–12d may advantageously be configured to perform one or more wireless packet data protocols such as described in, e.g., the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 are coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20. In one embodiment the mobile stations 12a–12d communicate with the base stations 14a–14c over an RF interface defined in the aforementioned $3^{rd}$ Generation Partnership Project 2 "3GPP2", "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999), which is fully incorporated herein by reference.

During typical operation of the wireless communication network 10, the base stations 14a–14c receive and demodulate sets of reverse-link signals from various mobile stations 12a–12d engaged in telephone calls, Web browsing, or other data communications. Each reverse-link signal received by a given base station 14a–14c is processed within that base station 14a–14c. Each base station 14a–14c may communicate with a plurality of mobile stations 12a–12d by modulating and transmitting sets of forward-link signals to the mobile stations 12a–12d. For example, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In one embodiment a table of gains and pilot channel power levels for the mobile stations 12a–12d is stored in each base station 14a–14c to enable the base station 14a–14c to specify traffic channel power levels for mobile stations 12a–12d with which the base station 14a–14c is communicating. The table contains three different sets of gains and pilot levels for each combination of data rate in bits per second (bps), target frame error rate (FER) (either one or five percent), type of forward error correction coding used by the mobile station (either convolutional coding or turbo coding), and frame length (twenty milliseconds (ms) for fundamental traffic channels and five, twenty, forty, or eighty ms for supplemental channels). The gains are expressed in decibels as ratios of the traffic channel level to the pilot channel level, multiplied by eight. The three different sets advantageously correspond to three different ranges of velocity for a given mobile station 12: static (AWGN) (0 km/hr.), slow (1–30 km/hr.), and fast (>30 km/hr.). In another embodiment the ranges are 0 km/hr., 1–60 km/hr., and >60 km/hr. Those skilled in the art would recognize that any set of adequate sizes may be used for the ranges. The velocity for the mobile station 12 is estimated in accordance with any of several methods described below. The sets of gains in the gain table may advantageously be modified periodically. In a particular embodiment, the gain table entries are modified every ten seconds, and the frame length is twenty ms, so the gain table is modified every 500 frames.

Providing multiple gains to choose from based on the estimated velocity of the mobile station 12 is advantageous because for a given target FER, the traffic to pilot ratio (gain) varies with the velocity of the mobile station 12. It would be readily appreciated by those of skill that any number, not limited to three, of velocity ranges could be used.

In one embodiment, for a given mobile station 12, the reverse-link pilot channel transmit power, P, is defined as Ec/Io for the pilot channel, the energy per chip divided by the interference spectral density from other mobile stations 12a–12d. For target FERs of one percent and five percent, and for various data rates in bps, the pilot channel transmit power is stored in the gain table, which may advantageously be a lookup table (LUT) implemented with ROM, EPROM, EEPROM, or flash memory. The pilot channel transmit power may be derived from the bit energy per noise spectral density, Eb/No, the inverse of the gain (i.e., the ratio of pilot channel transmit power to traffic channel transmit power), ρ, and the data rate, r, in accordance with the following equation:

$$P = 10 \log_{10}[10^{(Eb/No+\rho)/10}/(1+10^{\rho/10})] - 10 \log_{10}[1.2288 \times 10^6/r].$$

In the above equation, a chip rate of 1.2288 MHz is used in accordance with a particular embodiment wherein the cdma2000 system 10 is a 1× system, as specified in the aforementioned proposal. If the cdma2000 system 10 is a 3× system, three times the chip rate, or 3.6864 MHz, is used instead, also as specified in the aforementioned proposal.

In one embodiment the reverse-link traffic channel transmit power, T, for a given mobile station 12 is defined as Ec/Io for the traffic channel. The traffic channel transmit power is derived by multiplying the pilot channel transmit power by the gain. In a particular embodiment, as specified in the aforementioned proposal, the pilot channel transmit power level is expressed as a dB value, the gain is expressed as a dB value and multiplied by eight, and the dB value of the traffic channel transmit power level is obtained by adding the dB values for the gain and the pilot channel transmit power level.

In one embodiment velocity estimation for a mobile station 12 may advantageously be accomplished by estimating the Doppler frequency, which is proportional to the velocity of the mobile station 12. There are three proposed methods of velocity estimation, any one of which, or combination of any two of which, or all which may be performed: (1) level crossing; (2) covariance approximation; and (3) Doppler spectrum estimation. In conjunction with any of these methods, the forward-link pilot signal may advantageously be used because it is a relatively strong channel. The calculations, and the use of the gain table, may be implemented with a processor, memory, and an instruction module executable by the processor, or with other equivalent forms of hardware or software, as described further below.

In one embodiment the velocity of a mobile station 12 is estimated using level crossing. This is an advantageous method because the faster the fading in the channel, the faster the received pilot power will cross a given power level. The envelope level crossing rate, LCR, is defined as the average number of times per second that the traffic channel signal from the mobile station 12 crosses a predefined reference level, R, in a positive direction. In a particular embodiment, the level crossing velocity estimation technique is applied to either the in-phase (I) component or the quadrature (Q) component of the signal using a zero crossing rate, ZCR.

The following equations may be used to estimate the velocity of the mobile station 12 in accordance with one embodiment wherein level crossings are employed or, respectively, with another embodiment wherein zero crossings are employed:

$$\hat{v}_{LCR} \approx \frac{\lambda_c \hat{L}_{R_{RMS}} e}{\sqrt{2\pi}}, \text{ or } \hat{v}_{ZCR} \approx \frac{\lambda_c \hat{L}_{ZCR}}{\sqrt{2}},$$

in which $\lambda_c$ is the wavelength of the carrier signal, $\hat{L}_{R_{RMS}}$ is the number of level crossings, $\hat{L}_{R_{RMS}}$ is the number of zero crossings (times the signal crosses zero), $\hat{v}_{LCR}$ is the estimated velocity using level crossings, $\hat{v}_{ZCR}$ is the estimated velocity using zero crossings, and e is the constant that is the base for the natural logarithm (ln). In one embodiment the steps are to estimate the average power $P_{RMS}$, determine the number of level crossings per second, $\hat{L}_{R_{RMS}}$, and solve for the estimated velocity, $\hat{v}_{LCR}$, using the first-above equation. The average power, $P_{RMS}$, may be estimated multiplying the power at predefined time increments by the power one time increment earlier, summing the resulting products, and taking the square root of the sum. In a particular embodiment, each time increment is 1.25 ms.

In another embodiment the velocity of a mobile station 12 is estimated using covariance approximation. An estimate is made of the auto-covariance between faded samples r[i]. The faded samples r[i] may be the envelope samples, the squared-envelope samples, or the log-envelope samples. The value $\tau_t$ is defined as the samples spacing in units of seconds per sample. The value $\mu_{rr}(0)$ is defined as the energy of the received signal r[k] ($\mu_{rr}(k)$ being the covariance). For the squared envelope, the velocity of the mobile station 12 may be estimated in accordance with the following equation:

$$\hat{v}_{COV} \approx \frac{\lambda_c}{2\pi\tau_t} \sqrt{\frac{V}{\mu_{rr}(0)}},$$

where V $$V = \frac{1}{N}\sum_{k=1}^{N}(r[k+\tau_t] - r[k])^2,$$

$\hat{v}_{COV}$ is the estimated velocity using covariance approximation, k is the sample index, N is a moving window size, and $\overline{V}$ is an average value of V. The signal energy, $\mu_{rr}(0)$, may be estimated in accordance with a number of methods known to those of skill in the art. In a particular embodiment, the moving window size, N, is one frame, or twenty ms. In a particular embodiment, the average value, $\overline{V}$, is taken over ten frames.

In another embodiment the velocity of a mobile station 12 is estimated using Doppler spectrum estimation. A velocity estimation using Doppler spectrum estimation requires a Wide Sense Stationary Uncorrelated Scattering (WSSUS) channel. Accordingly, it is necessary to estimate in a relatively small time region in which the speed is practically constant. An exemplary time region is 5 ms. If $I_0$ is denoted the energy in the path, and $f_D$ is defined as the maximum Doppler frequency, the autocorrelation is assumed to be given by the following equation:

$$r_h(k) = I_0 J_0(2R \cdot f_D k), k \in N, \text{ with } f_D = (v/c) f_c,$$

in which R denotes the data rate, $J_0(x)$ denotes the Bessel function of zero order, v is the speed of the mobile station 12, c is the speed of light, and $f_c$ is the frequency of the carrier signal. The only unknown is $f_D$, and a good estimate of $f_D$ directly yields the velocity of the mobile station 12.

The value $h_1(i)$ is denoted as the output of a pilot channel filter at time i in a first frame, frame 1. The autocorrelation function for frame n, using estimates from frames n–M to n–1, for a data slot of length N, is specified by the following equation:

$$\hat{r}_h(k) = \frac{1}{M}\sum_{l=n-1}^{n-M}\hat{r}_{h,l}(k), \text{ where}$$

$$\hat{r}_{h,l}(k) = \frac{1}{N-|k|}\sum_{i=0}^{N-1-|k|}h_l(i)h_l^*(i+k).$$

A least-square cost function, C, may be formulated according to the following equation:

$$C = \sum_{k}\left[I_0 J_0(2R\pi f_D k) - \hat{r}_h(k)\right]^2,$$

in which k represents the points uniformly sampled within the range 0 to N–1. Setting $$\frac{dC}{df_D} = 0$$

yields the least-square estimate of $f_D$ after numerical solution in accordance with approximation techniques that are known in the art.

The required number of sampling points per frame is advantageously fifteen to thirty. It is sufficient to use 0.2–0.4 seconds of data to achieve a good estimate at high velocity (e.g., 50–100 km/hr.). As the speed of the mobile station 12 decreases, additional data may be required.

In one embodiment the gain table may be modified as follows: The exact velocity estimate is not required in order to accurately predict the required gain. It is sufficient to categorize the gains as being associated with one of three possible velocity categories: stationary (0 km/hr.), mid-range (1–30 km/hr.) and high speed (>30 km/hr.). Three different optimized values for the gain ($G_L$, $G_M$, and $G_H$) may advantageously be used based on the velocity estimate. In a particular embodiment a metric of the following form is used:

$$\alpha_L G_L + \alpha_M G_M + \alpha_H G_H,$$

in which the scaling values $\alpha_L, \alpha_M,$ and $\alpha_H$ are chosen as needed. Indeed, the scaling values can be indicator functions for use in the Doppler spectrum estimation method described above. In the alternative, the scaling values can be positive quantities, each less than one, summing to unity. This advantageously yields significant power savings, resulting in higher battery life and greater capacity.

Figure 2:
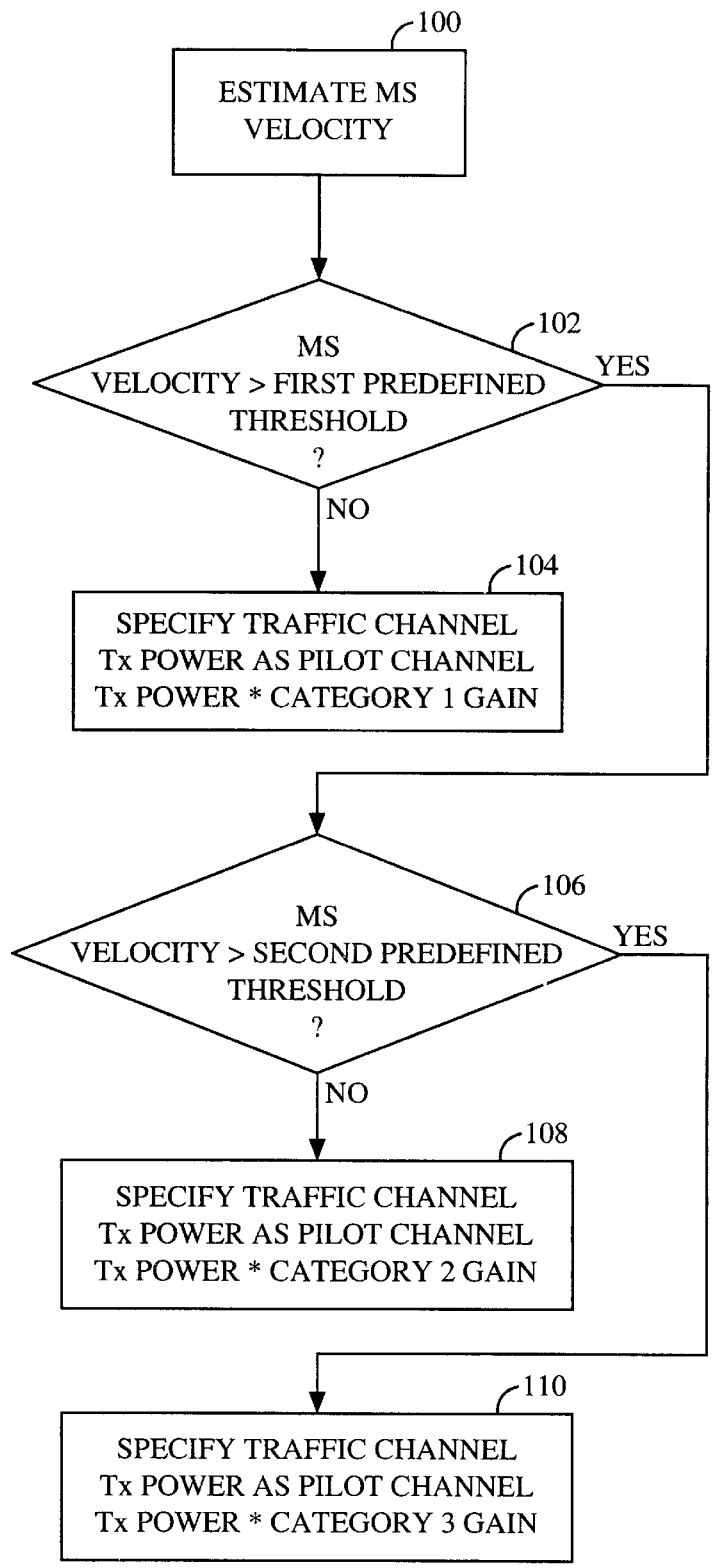
FIG. 2 is a flow chart illustrating method steps used to update a gain table.

In one embodiment an infrastructure element, such as, e.g., a base station, of a wireless communication system performs the steps illustrated in the flow chart of FIG. 2 to modify a gain table for a mobile station. The steps may advantageously be implemented with a processor, memory, and an instruction module executable by the processor, or with other equivalent forms of hardware or software, as described further below.

In step 100 the infrastructure element estimates the velocity of a mobile station with which the infrastructure element is communicating. In one embodiment the velocity estimation is performed using the level crossing technique described above. In another embodiment the velocity estimation is performed using the covariance approximation technique described above. In another embodiment the velocity estimation is performed using the Doppler spectrum estimation technique described above. The infrastructure element then proceeds to step 102.

In step 102 the infrastructure element compares the estimated velocity to a first predefined threshold value. If the velocity estimate is not greater than the first predefined threshold value, the infrastructure element proceeds to step 104. In step 104 the infrastructure element specifies traffic channel transmit power levels for the mobile station for various target FERs and data rates by multiplying pilot channel transmit power levels by associated category 1 gains. Category 1 gains are advantageously gains associated with low or almost zero velocity for the mobile station. If, on the other hand, the velocity estimate is greater than the first predefined threshold value in step 102, the infrastructure element proceeds to step 106.

In step 106 the infrastructure element compares the estimated velocity to a second predefined threshold value. If the velocity estimate is not greater than the second predefined threshold value, the infrastructure element proceeds to step 108. In step 108 the infrastructure element specifies traffic channel transmit power levels for the mobile station for various target FERs and data rates by multiplying pilot channel transmit power levels by associated category 2 gains. Category 2 gains are advantageously gains associated with mid-range velocity for the mobile station. If, on the other hand, the velocity estimate is greater than the second predefined threshold value in step 106, the infrastructure element proceeds to step 110.

In step 110 the infrastructure element specifies traffic channel transmit power levels for the mobile station for various target FERs and data rates by multiplying pilot channel transmit power levels by associated category 3 gains. Category 3 gains are advantageously gains associated with high velocity for the mobile station.

There are a number of issues affecting velocity estimation accuracy. One key issue is the large biases in such estimates due to noise. Unless the effective signal-to-noise ratio (SNR) is quite large, e.g., 20–25 dB, the biases are enormous. And even with 20 dB SNR, it may be desirable to employ a bias correction.

Assume, for example, that the Ec/Io for the pilot channel is −7 dB and the geometry is roughly 0 dB. The effect of coherently combining M chips may be observed as follows. M must be on the order of 1000 to bring the SNR to a reasonable range. The following assumptions can be made: (1) single path Rayleigh fading (Ricean fading may be more critical); (2) pilot chip rate=1.2288 Megachips per second (Mcps); (3) maximum Doppler frequency=fd; (4) M chips are combined for an interval $\tau$, where $\tau = M \cdot 10^{-6}/1.2288$; (5) the estimate of fd is given by the following equation:

$$\text{fd\_est} = \frac{1}{2\pi\tau}\sqrt{\frac{V}{sv(y_i)}},$$

in which $$V = \frac{1}{N}\sum_{i=1}^{N}(y_{i+1} - y_i)^2,$$

$y_i$=energy of M accumulated pilot chips in interval I of length $\tau$, $$y_i = \sum_{j=0}^{M-1} z_{i\tau + j\tau/M}, \text{ and}$$

sv=sample variance.

To minimize errors, $\tau$ should be small compared to 1/fd that enough samples, N, can be collected before the channel changes. Additionally, with additive noise, there are bias errors and random errors around the bias, so the SNR must be high to control both, particularly the bias because more samples can reduce the sampling error but not the bias. Other potential sources of error are described in G. L. Stuber, *Principles of Mobile Conimunications* (Kluwer Academic Publishers 1996).

The analysis, using normalizations, is summarized by the following equations:

$$E(\text{fd\_est}) \cong \frac{1}{2\pi\tau}\sqrt{\frac{E(V)}{E(sv(y_i))}} = \frac{1}{2\pi\tau}\sqrt{\frac{2[\text{var}(y_i) - \text{cov}(y_{i+1}, y_i)]}{\text{var}(y_i))}}$$

$$\text{var}(y_i) = M + \sum_{j=1}^{M-1}(M-j)[J_o(2\pi fd j\tau/M)]^2$$

$$\text{cov}(y_{i+1}, y_i) = \sum_{j=1}^{2M-1}\min(j, 2M-j)[J_o(2\pi fd j\tau/M)]^2$$

Figure 3:
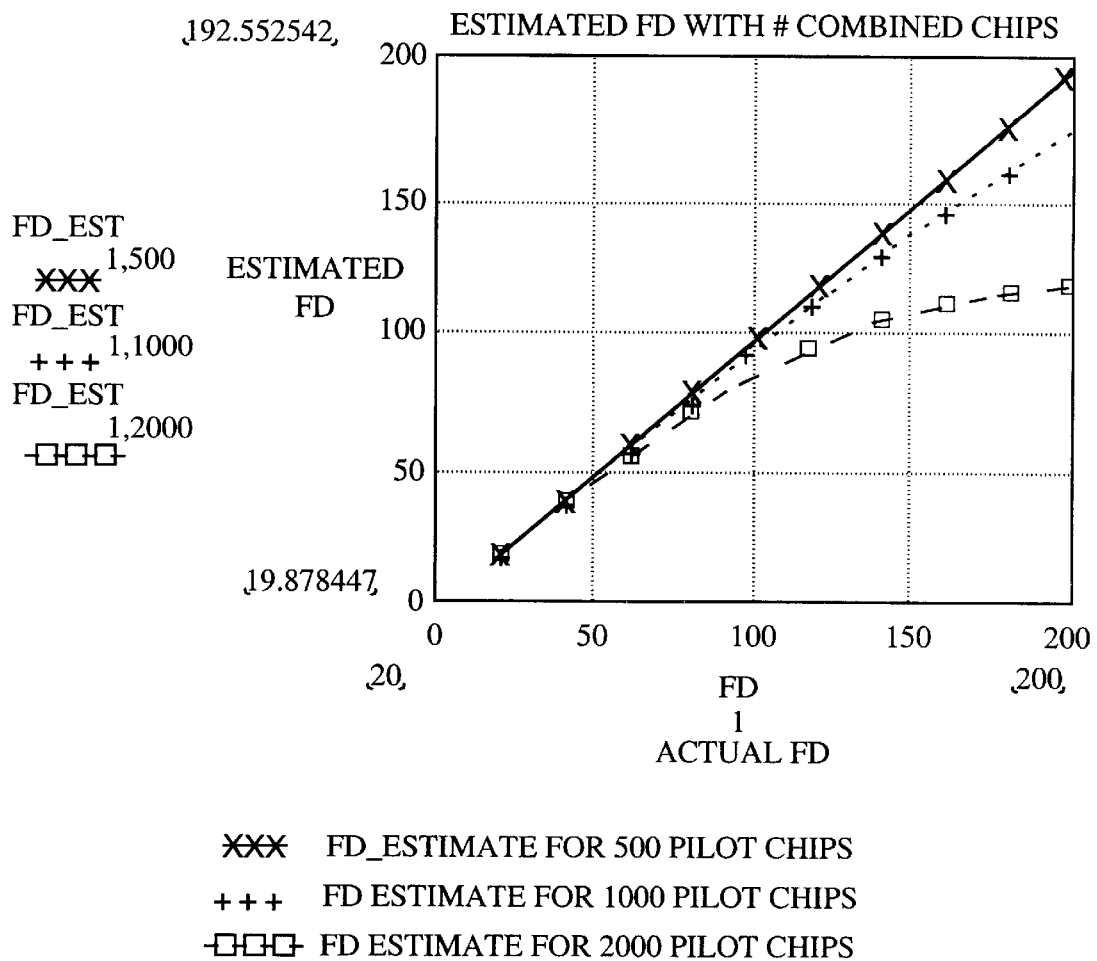
FIG. 3 is a graph of expected maximum Doppler frequency as a function of true maximum Doppler frequency.

The graph of FIG. 3 plots the expected fd_est as a function of the true fd and the number of accumulated chips (raising the SNR). It can be seen that there is a tradeoff between raising the SNR and introducing a new bias due to increasing the interval $\tau$.

Thus, a novel and improved method and apparatus for requesting PPP instances from a packet data services network have been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method of modifying a transmit power level of a mobile station in a wireless communication network, comprising:

estimating a velocity of the mobile station with a level crossing technique, wherein the level crossing technique comprises:
estimating an average power level to determine a number of level crossings per second;
multiplying a carrier signal frequency, the number of level crossings per second, and a constant, e, to generate a product; and
dividing the product by a square root of $2\pi$ to generate the estimated velocity; and modifying the transmit power level of the mobile station based on the estimated velocity.

2. A method of modifying a transmit power level of a mobile station in a wireless communication network, comprising:

estimating a velocity of the mobile station with a covariance approximation technique, wherein the covariance approximation technique comprises estimating the velocity in accordance with the following equation:

$$\tilde{v}_{COV} \approx \frac{\lambda_C}{2\pi\tau_t}\sqrt{\frac{V}{\mu_\pi(0)}},$$

where $$V = \frac{1}{N}\sum_{k=1}^{N}(r[k+\tau_t] - r[k])^2,$$

$\hat{v}_{COV}$ is the estimated velocity, $\mu_{rr}(0)$ is a signal energy level, $\tau_t$ is a sample spacing, $\lambda_c$ is a carrier signal wavelength, k is a sample index, N is a moving window size, and $\overline{V}$ is an average value of V; and modifyng the transmit power level of the mobile station based on the estimated velocity.

3. The method of claim 2, further comprising the step of estimating the signal energy level.

4. An infrastructure element in a wireless communication network, comprising:
    means for estimating a velocity of a mobile station in the wireless communication network using a level crossing technique, the level crossing technique comprising:
        estimating an average power level to determine a number of level crossings per second;
        multiplying a carrier signal frequency, the number of level crossings per second, and a constant, e, to generate a product; and
        dividing the product by a square root of 2π to generate the estimated velocity; and
    means for modifying the transmit power level of the mobile station based on the estimated velocity.

5. An infrastructure element in a wireless communication network, comprising:
    a processor; and
    a processor-readable storage medium coupled to the processor and containing an instruction set executable by the processor to estimate a velocity of a mobile station in the wireless communication network and modify a transmit power level of the mobile station based on the estimated velocity, wherein the instruction set is further executable by the processor to estimate the velocity with a level crossing technique comprising:
        estimating an average power level in order to determine a number of level crossings per second;
        multiplying a carrier signal frequency, the number of level crossings per second, and a constant, e, to generate a product; and
        dividing the product by a square root of 2π in order to generate the estimated velocity.

6. An infrastructure element in a wireless communication network, comprising:
    a processor; and
    a processor-readable storage medium coupled to the processor and containing an instruction set executable by the processor to estimate a velocity of a mobile station in the wireless communication network and modify a transmit power level of the mobile station based on the estimated velocity, wherein the instruction set is further executable by the processor to estimate the velocity with a covariance approximation technique, wherein the covariance approximation technique comprises estimating the velocity in accordance with the following equation:

$$\hat{v}_{COV} \approx \frac{\lambda_C}{2\pi\tau_t}\sqrt{\frac{\overline{V}}{\mu_\pi(0)}},$$

where $$V = \frac{1}{N}\sum_{k=1}^{N}(r[k+\tau_t] - r[k])^2,$$

$\hat{v}_{COV}$ is the estimated velocity, $\mu_{rr}(0)$ is a signal energy level, $\tau_t$ is a sample spacing, $\lambda_c$ is a carrier signal wavelength, k is a sample index, N is a moving window size, and $\overline{V}$ is an average value of V.

7. The infrastructure element of claim 6, wherein the instruction set is further executable by the processor to estimate the signal energy level.

8. An infrastructure element in a wireless communication network, comprising:
    a velocity estimation module configured to estimate a velocity of a mobile station in the wireless communication network using a level crossing technique, the level crossing technique comprising:
        estimating an average power level in order to determine a number of level crossings per second;
        multiplying a carrier signal frequency, a number of level crossings per second, and a constant, e, to generate a product; and
        dividing the product by a square root of 2π in order to generate the estimated velocity; and
    a gain table modification module coupled to the velocity estimation module and configured to modify a gain table in the infrastructure element based on the estimated velocity, the gain table containing gains for use in modifying a transmit power level of the mobile station.

9. An infrastructure element in a wireless communication network, comprising:
    a velocity estimation module configured to estimate a velocity of a mobile station in the wireless communication network using a covariance approximation technique, wherein the covariance approximation technique comprises estimating the velocity in accordance with the following equation:

$$\hat{v}_{COV} \approx \frac{\lambda_C}{2\pi\tau_t}\sqrt{\frac{\overline{V}}{\mu_\pi(0)}},$$

where $$V = \frac{1}{N}\sum_{k=1}^{N}(r[k+\tau_t] - r[k])^2,$$

$\hat{v}_{COV}$ is the estimated velocity, $\mu_{rr}(0)$ is a signal energy level, $\tau_t$ is a sample spacing, $\lambda_c$ is a carrier signal wavelength, k is a sample index, N is a moving window size, and $\overline{V}$ is an average value of V; and a gain table modification module coupled to the velocity estimation module and configured to modify a gain table in the infrastructure element based on the estimated velocity, the gain table containing gains for use in modifying a transmit power level of the mobile station.

10. The infrastructure element of claim 9, where e velocity estimation module is further configured to estimate the signal energy level.

* * * * *